& Patented Feb. 19, 1952

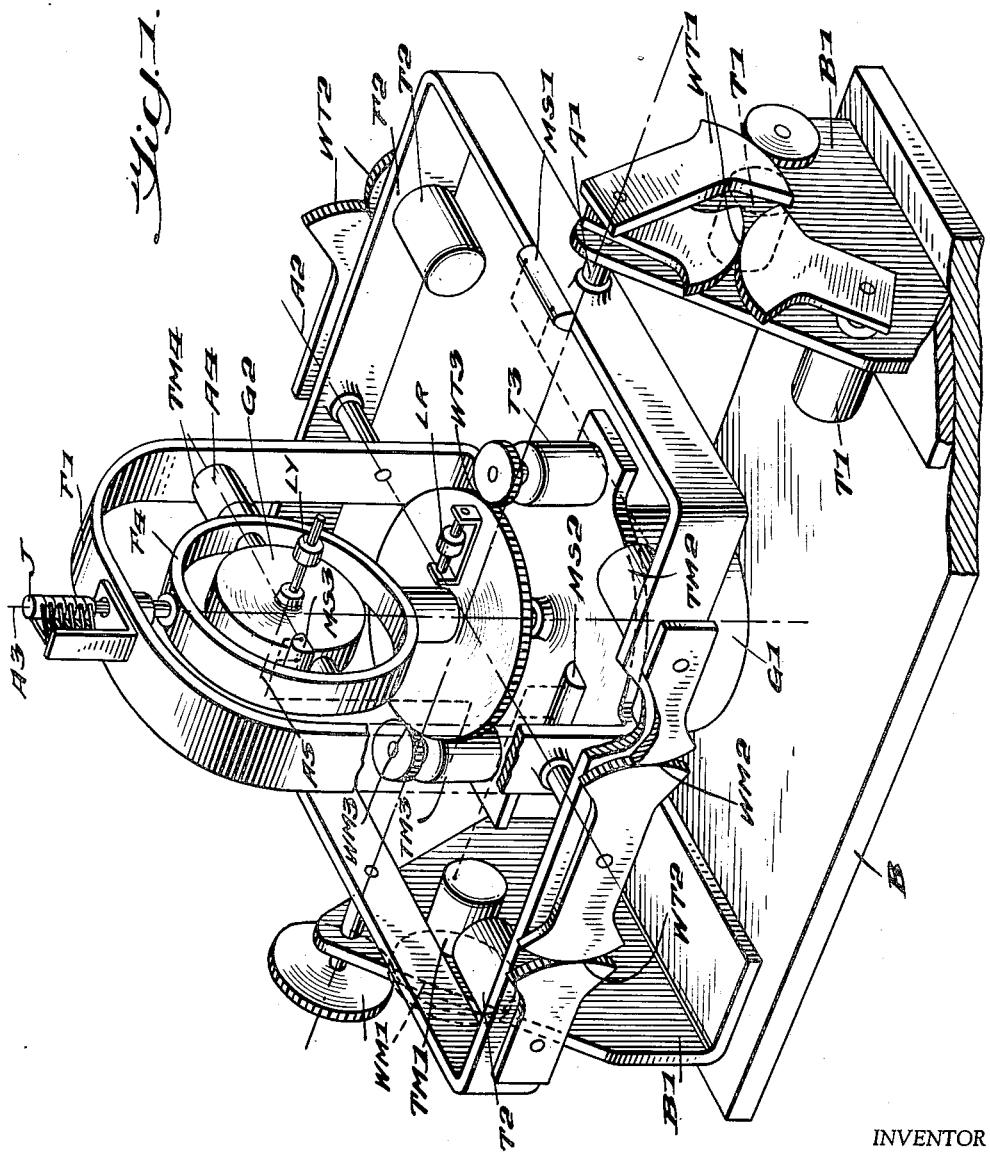

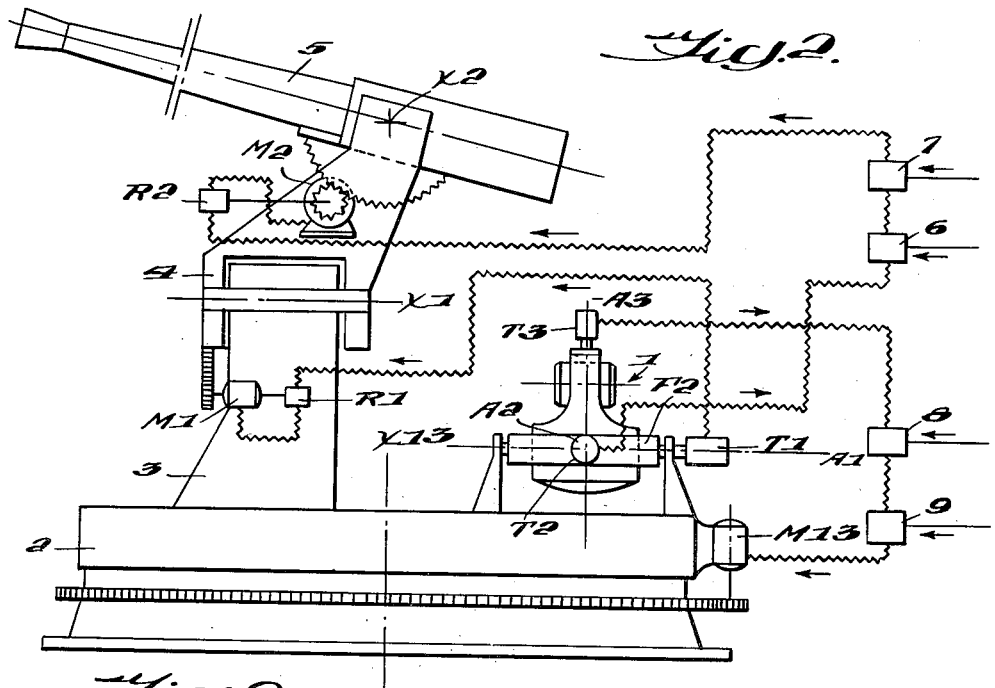
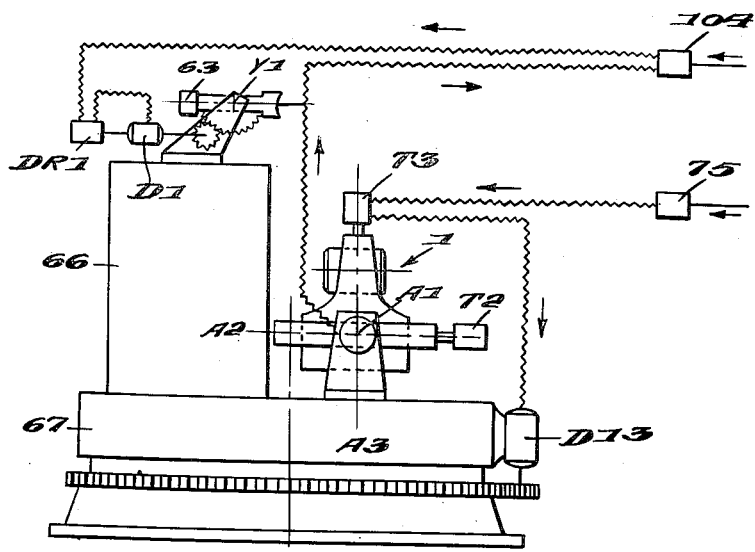

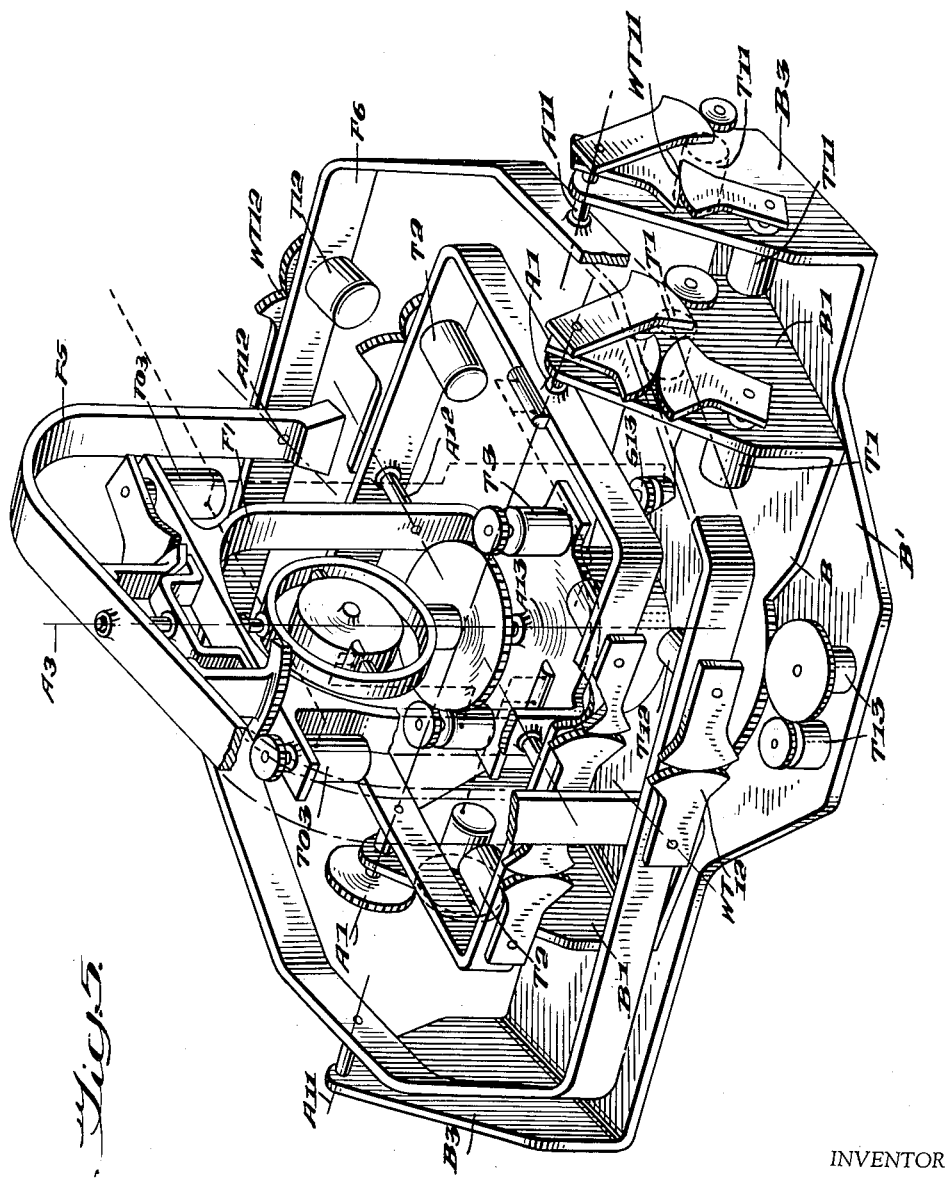

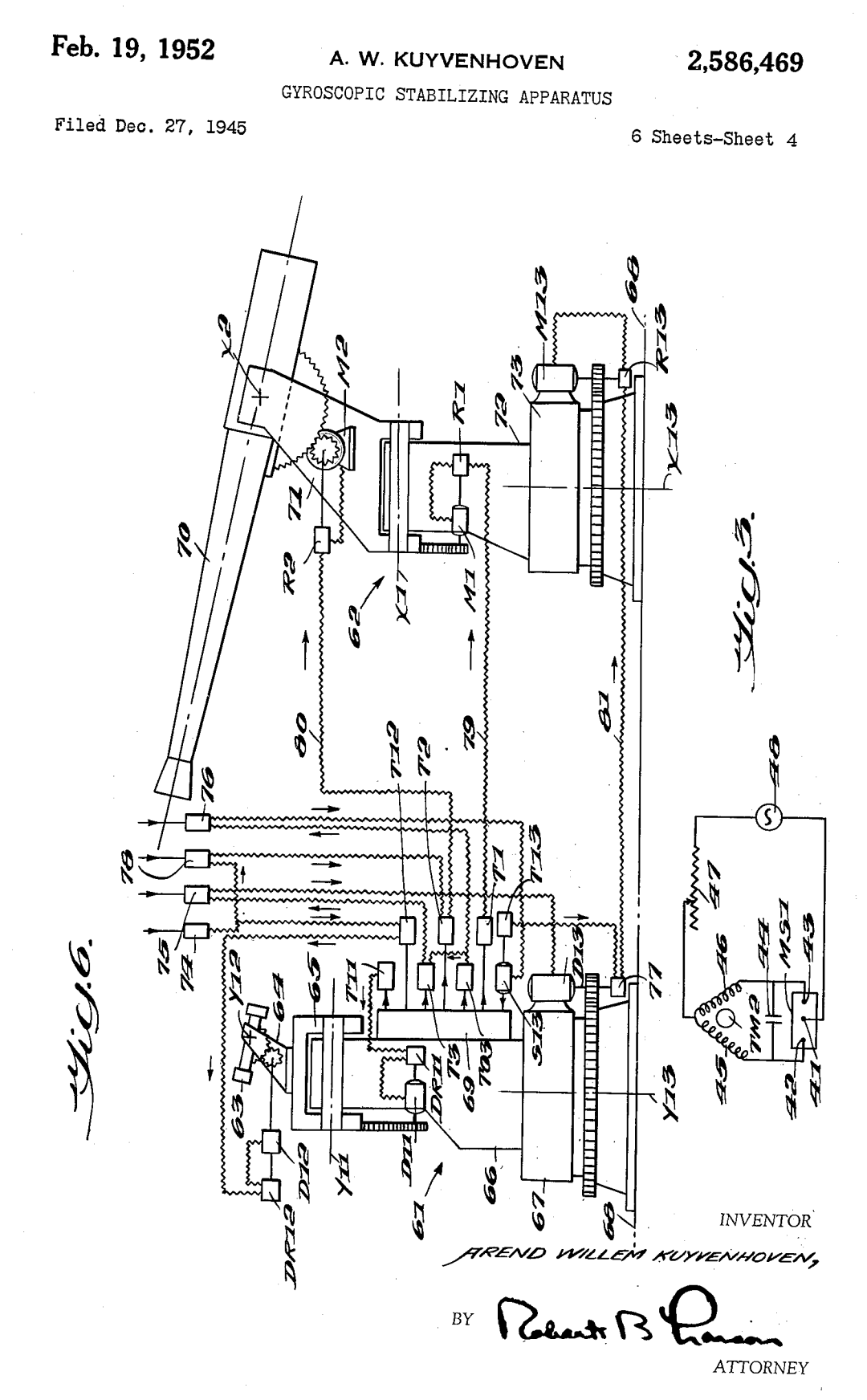

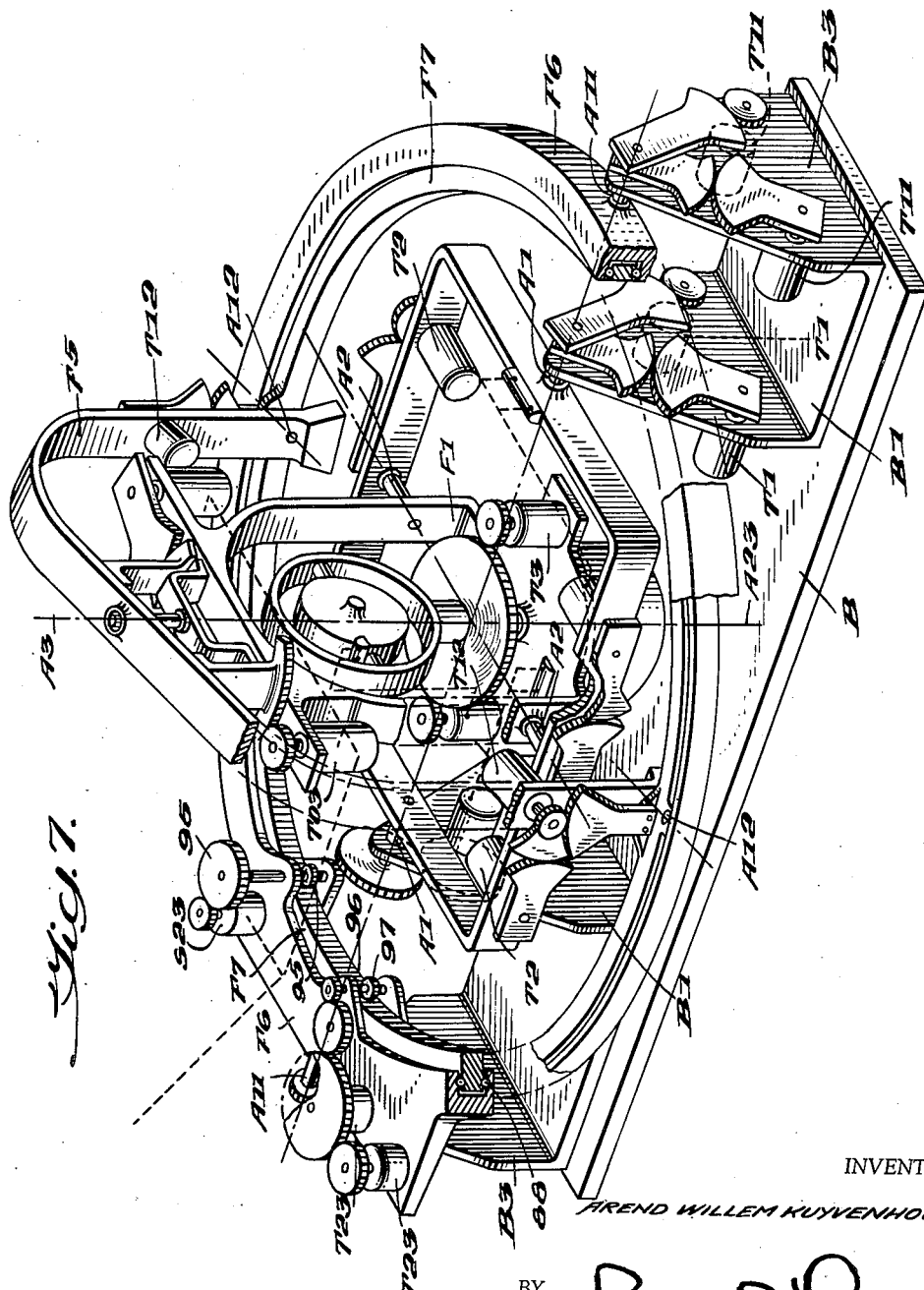

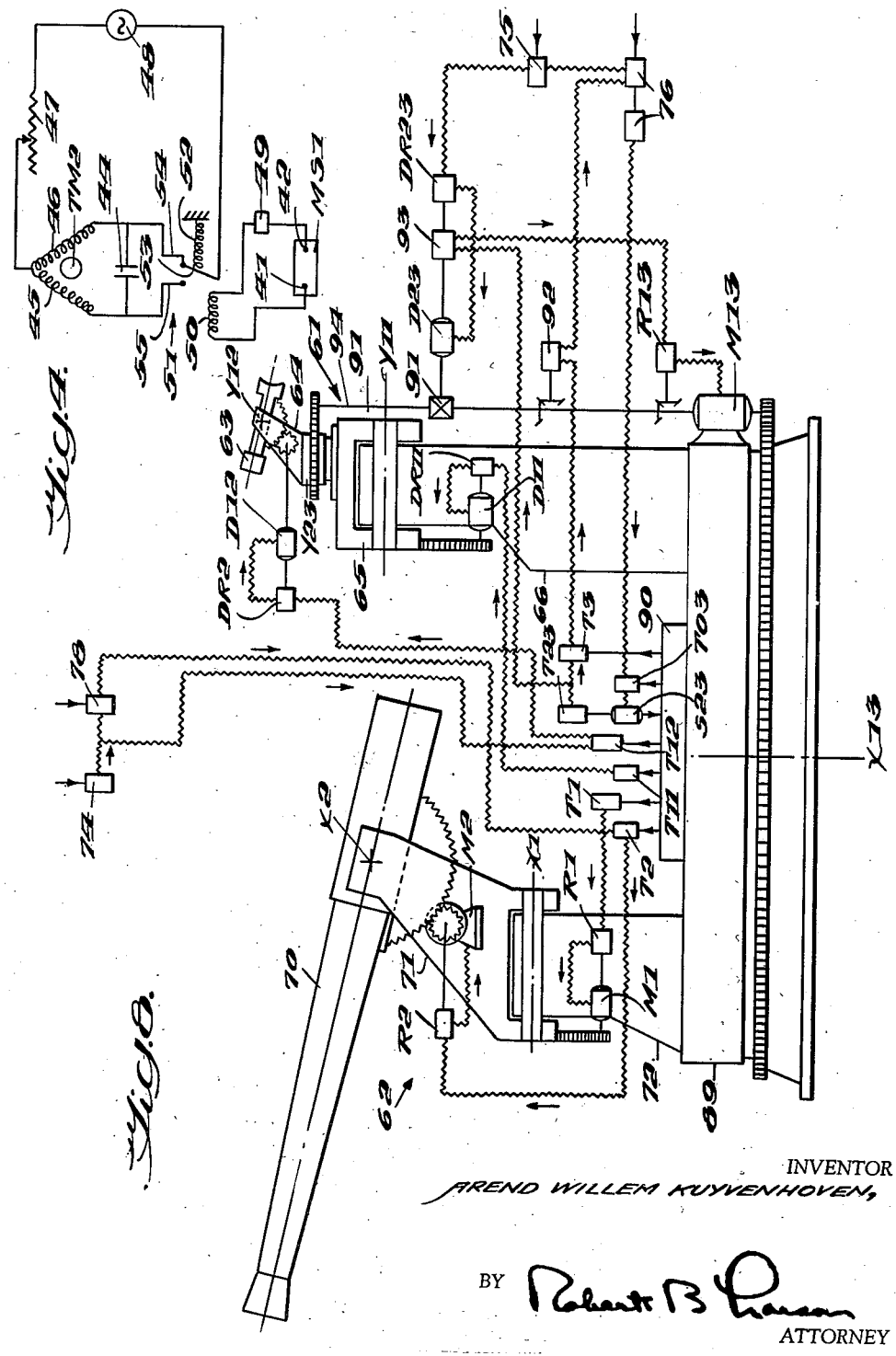

2,586,469

UNITED STATES PATENT OFFICE 2,586,469

GYROSCOPIC STABILIZING APPARATUS

Arend Willem Kuyvenhoven, Richmond, England, assignor to "Brevets Aero-Mecaniques," S. A., Geneva, Switzerland, a society of Switzerland Application December 27, 1945, Serial No. 637,439
In Great Britain March 16, 1943

Section 1, Public Law 690, August 8, 1946
Patent expires March 16, 1963

10 Claims. (Cl. 74—5.34)

The invention relates to gyroscopic apparatus of the kind employed for the stabilization of gun mountings, directors, sights, searchlights or the like (hereinafter referred to generally as "controlled apparatus") mounted on ships, aircraft, tanks or other moving bodies, whereby such controlled apparatus is caused to maintain an angular disposition in space which is independent of the angular movements of the moving body occasioned by roll, pitch, yaw or change of course.

The term "controlled apparatus" is intended to include any piece of apparatus having an axis (such as the line of fire of a gun, the axis of a searchlight beam or the line of sight of a director or sighting device) which is required to be stabilized and, in general, to be capable of orientation in space; this axis will be referred to generally as the "principal axis" of the particular piece of controlled apparatus.

The main object of the present invention is the provision, by the use of a pair of gyroscopes, of stabilized horizontal and vertical datum planes with respect to which the principal axis of the controlled apparatus may be given elevational and training movements; the invention is thus to be distinguished from known apparatus in which the principal axis is stabilized by keeping it parallel with the axis of a single free gyro, which provides no such datum planes.

In a broad sense, the invention is concerned with gyroscopic stabilizing apparatus of the nonpendulous type, and comprising a first gyroscope providing a horizontal plane datum, a gimbal frame member supporting said first gyroscope, a second gyroscope gimbal mounted on said frame member to provide a vertical plane datum, said second gyroscope with its gimbal mounting forming a subsidiary non-pendulous system rotatable about the line of the spin axis of said first gyroscope, torque motors connected to bring about precession of said gyroscopes and vertical sensitive elements for controlling the operation of said torque motors to maintain the spin axis of said first gyroscope substantially vertical and to maintain the spin axis of said second gyroscope substantially horizontal.

The stabilizing movements are preferably given to the controlled apparatus with respect to the moving body by power units operated from transmitters whose outputs represent the instantaneous angular displacements between the horizontal and vertical datum planes provided by the stabilizing apparatus and planes or axes fixed with respect to the moving body and partici- pating in its angular movements (such as the deck plane and fore-and-aft line of a ship).

By the term "torque motor" in the preceding paragraph and the claims is meant a device comprising a stator and a rotor between which unlimited relative rotational movement is possible, and between which a torque can be produced which is independent of the degree of the said movement. Alternating current induction motors, working either from a three-phase supply or a single phase supply in conjunction with a phase-splitting arrangement, are the preferred form of such motors. The term does not include the simple arrangement of an electro-magnet or solenoid with an armature, in which only limited relative movement is possible and the force applied varies with the extent of the said movement.

In the application of the invention to various gunnery problems it is frequently necessary to convert stabilizing impulses provided by the stabilizing unit with respect to one set of axes into corresponding impulses with respect to another set of axes. For example, in a fire control system incorporating a director or sight and a gun the principal axes of the sight and the gun differ by the quantities known as lateral and vertical deflection, so that if the stabilizer is carried on the director and used directly to stabilize the sight, corrections have to be applied to the stabilizing impulses to effect the correct stabilization of the gun. One way of effecting such corrections depends upon the use of corrector units as hereinafter described; such corrector units, however, generally employ complex systems of solid cams, and it is a further object of the present invention to minimize the use of such units by incorporating a resolving mechanism directly with the stabilizing unit.

Accordingly, a stabilizing unit according to the invention may be mounted within a further gimbal system adapted to resolve the stabilizing impulses provided by the said unit into corresponding impulses with respect to a system of axes different from that system of axes with respect to which stabilizing impulses are given directly by the unit itself.

Reference will now be made to the accompanying drawings, in which:

Figure 1 is a perspective and largely schematic view (with parts cut away for clarity of illustration) of a complete stabilizing unit;

Figure 2 is a diagram illustrating the application of the unit shown in Figure 1 to a control system;

Figures 3 and 4 are circuit diagrams of alternative switch and torque motor combinations.

Figure 5 is a view similar to Figure 1 of the stabilizing unit combination with plane conversion resolving mechanism;

Figure 6 is a diagram illustrating the application of the unit shown in Figure 5 to a gun control system;

Figure 7 is a view similar to Figure 5 of a stabilizing unit combined with an alternative arrangement of resolving mechanism;

Figure 8 is a diagram illustrating the application of the unit shown in Figure 7 to a particular gun control system;

Figure 9 illustrates a modified application of the unit shown in Figure 1 to a biaxial director.

Referring to Figure 1, the roll gyro has a spin axis normally coinciding with the vertical axis A3 and is mounted in a casing G1 rigidly secured in an inner gimbal frame F1; this is pivotally mounted about axis A2 within an outer gimbal frame F2 which in turn is pivotally mounted (about an axis A1 at right angles to A2) within brackets B1 on a base B secured to the moving body. The frame F1 also carries the yaw gyro as hereinafter described, the whole forming a non-pendulous combination (apart from the optional addition of a latitude rider LR as hereinafter described).

Since the spin axis of the roll gyro will tend to remain vertical, rolling and pitching motions of the moving body will result in relative movements (1) between the fixed brackets B1 and the frame F2, and (2) between the frames F2 and F1. These relative movements are respectively imparted (1) through gearing WT1 to a pair of transmitters T1, and (2) through gearing WT2 to a pair of transmitters T2. The two transmitters of each pair provide for fine and coarse control in known manner, and for purposes of description may thus be regarded as a single transmitter. These transmitters form part of any convenient electrical or mechanical systems for the systems for the transmission of angular indications, and it is clear that by coupling them to power follow-up devices incorporated in controlled apparatus having a system of relatively movable parts geometrically similar to that of the gyro unit described, a given axis on the controlled apparatus (corresponding with the gyro spin axis) can be caused to remain substantially vertical notwithstanding the pitching and rolling motions of the moving body.

With such an arrangement, however, small torques are continually being applied to the gyro by the friction of the bearings, the slight load imposed by the transmitters T1 and T2, and any small lack of true balance of the system as a whole. These torques and the appropriate component of earth rotation would, if uncompensated, result in a precession of the gyro which would cause its spin axis (and consequently the corresponding axis of the controlled apparatus) to stray from the true vertical axis A3. By the use of precessing torque motors with vertical-sensitive control, however, such straying is confined to very small limits.

A pair of mercury switches MS1, MS2 are mounted on the frames F2 and F1 respectively. The switch MS1 controls a split-phase induction torque motor TM2 in either one of the ways hereinafter more particularly described with reference to Figures 3 and 4, the arrangement being such that this motor will apply a torque to the frame F1 (via gearing WM2) whose direction depends upon the direction in which the switch MS1 is tilted. If, therefore, the frame F2 tilts in a given direction with respect to the vertical, the switch MS1 will operate to energize the motor TM2, and the resulting torque applied by this motor is arranged to be such that it will cause the gyro to precess in the direction necessary to restore the frame F2 and hence the switch MS1 to their neutral position. The switch MS2 is connected in a similar manner to a torque motor TM1 which operates through the gearing WM1 to apply a torque to the frame F2. If desired the switch MS1 may be mounted on the frame F1 provided that its operative axis is correctly positioned.

The two control systems thus operate between them to prevent the spin axis of the gyro from ever departing from the true vertical axis A3 by more than a limited amount, which by suitable design of the switching system may be made very small. It will be appreciated, however, that from the point of view of stabilization the actual departure of the spin axis from the vertical (within the limits imposed by the design of the apparatus) may be of less importance than its rate of angular movement with respect to the vertical, which should be kept as low as possible. For this purpose rheostats are inserted into the circuits of the torque motors TM1 and TM2, and are adjusted to give torques just sufficient to overcome the disturbing forces referred to above. The value of these torques may be sufficiently low to correspond with a precessional rate of the order of 0.5' per second, which will therefore represent the maximum error in angular velocity in the output of the transmitters T1 and T2 under all conditions.

The value of using torque motors in accordance with the invention will be appreciated in this connection, since they provide a torque which is independent of the relative displacement between rotor and stator.

The yaw gyro has a horizontal spin axis A5 and is mounted in a casing G2 pivoted about a horizontal axis A4 at right angles to the spin axis within a gimbal frame F4; this in turn is pivoted about the vertical axis A3 within the frame F1 previously referred to. The yaw gyro and the casing G2 are also non-pendulous (apart from the optional addition of a latitude rider LY as hereinafter described).

Since the spin axis A5 of the yaw gyro will tend to remain in a particular azimuth, a yawing motion or change of course of the moving body will result in a relative movement between the frames F4 and F1. This relative movement is imparted through gearing WT3 to a transmitter T3 similar to the transmitters T1 and T2, and similarly coupled to a power follow-up device for effecting the stabilization of the controlled apparatus in azimuth.

Friction and the small load of the transmitter T3 will produce a torque about the vertical axis A3 such as to make the gyro precess about the pivotal axis A4 of the casing G2, and it is therefore necessary to apply a correcting precessing torque to maintain the spin axis A5 of the gyro in an approximately horizontal plane. For this purpose a mercury switch MS3 is associated with the casing G2 and is coupled as previously described to a torque motor TM3 cooperating with gearing WM3. This motor is arranged, by adjustment of a rheostat, to produce (when energized by the operation of the mercury switch) a torque which just overcomes the maximum value of the disturbing torques referred to above, thereby precessing the gyro back so that the mercury switch MS3 breaks the circuit. The spin axis A5 of the gyro will thus "hunt" continuously about a mean horizontal position, from which it will never depart by more than a very small angle determined by the design of the switch system. Electrical connections to the yaw gyro and switch MS5 are effected through suitable slip-rings J.

Meanwhile, friction in the horizontal trunnions of the casing G2 during the very small hunting movement referred to above, any slight lack of true balance of this casing, and the component of the earth's spin about a vertical axis will all result in a very slow precession of the yaw gyro about the vertical axis A3, this gyro thus being of the type known as a "slow wanderer." Regarded as an azimuth datum, however, the actual position of the spin axis does not matter in many applications provided that at any instant its rate of precession in the horizontal plane is sufficiently small.

If desired, instead of making the yaw gyro and its casing G2 strictly non-pendulous, a latitude rider LY may be located on the casing so as to produce a torque about the axis A4 and hence a uniform precession about the axis A3 which, by adjusting the weight or position of the rider in accordance with the latitude, may be made to compensate exactly for the effect of the earth's rotation. This eliminates the most important factor leading to "slow wander" of the yaw gyro.

In some applications it may be desired to make the yaw gyro north-seeking, so that it provides an invariable azimuth datum. This may readily be done by providing a torque motor TM4 which is adapted to apply a torque to the casing G2 about the axis A4 and is energized by misalignment between the transmitter T3 and a transmitter operated by the ship's gyro compass, thus causing very slow precessions about the axis A3 to keep the spin axis of the yaw gyro from departing from the true meridian by more than a very small amount. This arrangement provides an azimuth datum which incorporates both the north-seeking property of the compass and the very small precessional rate obtainable with the yaw gyro, a rate which is much smaller than that of the gyro compass itself.

The accelerations due to change of course and change of speed of the ship, which cause unidirectional forces to be applied to the system, affect only the mercury of the mercury switches, as the gyro arrangement is non-pendulous. For accelerations over a certain magnitude the mercury will therefore move away from its central position, make contact, and, if no device for switching off the torque motors during change of course and speed has been fitted, start the appropriate gyro to precess. The rate of precession is restricted by the setting of the resistance value in the particular torque motor circuit, and the precessional rate under all conditions of ship movement therefore cannot exceed the set value (say 0.5' per second for the roll gyro). The amplitude of error depends upon the duration (not the magnitude) of these unidirectional accelerations (in 15 seconds 15×0.5=7.5' for the roll gyro).

The effect of earth rotation on the yaw gyro (which can produce a maximum wander of 0.25' per second) may, as previously described, be substantially eliminated by the use of a latitude rider, in which case the precessional rate may be made appreciably lower than in the case of the roll gyro. If, however, the yaw gyro is controlled from the compass as described above a latitude rider LR may also be fitted on some suitable part associated with the frame F4 in order to eliminate the influence of earth rotation (maximum 0.25' per second) on the roll gyro, the precessional rate of the roll gyro thus being decreased by this amount.

The angular momentum of a gyro is directly proportional to its speed. The precessional rate produced by the torque motors is therefore inversely proportional to the gyro speed. When starting up the system, the torque motors will, during the running up of the gyro wheels, pull the system quickly into the erected position, no matter what the initial position of the non-pendulous system may be.

Since the roll gyro provides a horizontal plane and an axis A3 at right angles to it about which the frame F4 containing the yaw gyro rotates, horizontal and vertical datum planes are provided which, whatever the angular deviations of the system may be, will at all times remain at right angles to each other and to which, if this arrangement is used as a datum for measuring rates of a target, the angular movements of the target are also referred. These lateral and vertical target rates will therefore now represent the true rates of the target unaffected by roll rates, and they are at all times measured at right angles to each other.

Figure 2 illustrates schematically the application of the invention to a gun control arrangement, which will now be described.

As shown in Figure 2 a gyroscopic stabilizing unit 1 according to the invention (hereinafter referred to as a stabilizer) is mounted on a training base 2, which also carries the gun pedestal 3. A cradle 4 carrying the gun 5 is pivotally mounted on the pedestal 3 about an axis X1 parallel with the axis A1 of the stabilizer.

The transmitter T1 (corresponding with the pair of transmitters T1 in Figure 1) is wired to a motor M1 which rotates the cradle 4 about the axis X1, the arrangement being such that any rotation of the transmitter rotor from a datum position causes the motor to operate in the appropriate direction. A second transmitter R1 is connected in the circuit in such a way that its output combines differentially with that of T1, and the rotor of R1 is connected mechanically to the motor M1. The transmitter R1 thus acts as a resetter, any angular displacement of the rotor of T1 causing M1 to operate until it has moved the rotor of R1 through the same angle (in the opposite sense electrically); when this occurs M1 is again brought to rest, having copied exactly the movement of the rotor of T1. For convenience of illustration the wiring is indicated by a single wavy line, the whole arrangement being illustrated schematically and being capable of taking various forms, all of which will be familiar to those skilled in the art. A similar convention is used throughout all the figures in which similar transmission systems are illustrated, transmitters which are shown as being connected in series in a particular line being arranged so that their outputs are added differentially to those of other transmitters in the same line.

As a result of the stabilizing impulses from the transmitter T1 the motor M1 will thus operate to give the cradle 4 movements relative to the base 2 similar to those of the frame F2; the axis X2 of the gun trunnions will thus be kept horizontal and parallel with the axis A2. For stabilization about the axis X2, the transmitter T2 is connected in the manner previously described to the elevating motor M2 and resetter R2, the arrangement so far described thus stabilizing the gun completely as regards roll and pitch. Transmitters 6 and 7 may add in quantities such as generated elevation rate and vertical deflection, derived from other parts of the complete fire control system.

Finally, yaw stabilization is effected by the transmitter T3 and motor M13, which rotates the whole training base 2 relatively to the deck. It is important to note that in this case, since the motor M13 affects the stabilizer as well as the gun, no separate resetter is required, rotation of the whole stabilizer automatically restoring the initial relative position of the rotor and stator of the transmitter T3. It may also be noted that a given relative angular displacement between the transmitter rotor and stator will in general require a somewhat different angular displacement of the training base 2 for exact restoration, since the former displacement takes place about the vertical axis A3 and the latter about the axis X13 perpendicular to the deck plane; the motor M13 will operate until the said restoration is actually affected, however, irrespective of the angular movement of the training base required to achieve this. The difference between the displacements about the axes A3 and X13 is known as the deck training correction, and the automatic inclusion of this correction without the necessity for separate calculating apparatus is an important feature of the present invention. As in the elevating system, further transmitters 8 and 9 may add in other calculated quantities such as generated training rate and lateral deflection.

The arrangement described with reference to Figure 2 is obviously equally applicable to the stabilization of other forms of controlled apparatus; the gun shown in Figure 2 could, for example, be replaced by a director. The invention may also obviously be used to provide stabilized platforms on which any desired piece of apparatus may be mounted.

As regards the transmission of data from the stabilizer to the controlled apparaus the invention is not confined to any particular form of transmission system; as an alternative to systems of the types hitherto described hunter transmission may, for example, be used, the appropriate part of the gyro system constituting the sensitive element and cooperating with a follow-up element through a direct system of contacts, an electromagnetic pick-up arrangement, or a sensitive hydraulic valve.

Two alternative ways of operating the torque motors TM1, TM2 from the mercury switches MS2, MS1 respectively in Figure 1 will now be described with reference to Figures 3 and 4.

Figure 3 shows one possible circuit arrangement of the switch MS1 and associated apparatus, the arrangement in the case of the switch MS2 being similar. The switch MS1 comprises a small quantity of mercury (not shown) in permanent contact with an electrode 41 and adapted to make contact with either one of a pair of further electrodes 42, 43 in accordance with the direction in which the switch is tilted with respect to the vertical. The switch MS1 controls the split-phase induction motor TM2, the arrangement being such that this motor will apply a torque to the frame F1 (via gearing WM2) (Figure 1) whose direction depends upon the direction in which the switch MS1 is tilted. This is done by utilizing the switch to connect a condenser 44, which achieves the "phase-splitting" effect, in circuit with the A. C. supply 48 and one or other of two stator windings 45, 46 in the motor; a rheostat 47 is included in the circuit for the purpose specified in the description of Figure 1. If, therefore, the frame F2 tilts in a given direction with respect to the vertical, the switch MS1 will operate to energize the motor TM2 and the resulting torque applied by this motor is arranged to be such that it will cause the gyro to precess in the direction necessary to restore the frame F2 and hence the switch MS1 to their neutral position. The switch MS2 is connected in a similar manner to a torque motor TM1 which operates through the gearing WM1 to apply a torque to the frame F2. If desired the switch MS1 may be mounted on the frame F1 provided that its operative axis is correctly positioned. Switches of the kind described can be designed to operate for a displacement of the order of 2' or 3' in either direction from the neutral position.

Figure 4 shows an alternative circuit arrangement in which the electrode 43 in the switch MS1 is eliminated, the electrodes 41 and 42 being connected in circuit with an alternating or direct current supply 49 and the winding 50 of a relay 51. When the switch MS1 is open a spring 52 causes the contact arm 53 of the relay to engage a contact 54, while when the switch is closed the relay operates to bring the arm 53 into engagement with a contact 55. The members 53, 54, 55 thus replace the members 41, 42, 43 of Figure 3, the remainder of the circuit being identical. This arrangement has the advantages (a) that the current through the mercury switch can be made smaller than in the case of Figure 3 and (b) that the switch does not need to be so accurately made, since a simple make and break of the switch effects an instantaneous reversal of torque. As in the case of Figure 3, a similar arrangement is provided with respect to the switch MS2 and torque motor TM1. With this arrangement an accuracy of the order of ±0.5' can be obtained.

The invention is not confined to the use of mercury switches, as any suitable gravity-sensitive switch of comparable sensitivity could be used. Alternating current induction motors are, as previously stated, the preferred form of torque motor, since they have no brushes and therefore offer little friction. Any other type of torque motor may, however, be used, particularly in conjunction with the relay arrangement shown in Figure 4, since the relay can have any number of contacts for reversing the torque.

Means for effecting stabilization of apparatus about axes different from those of the stabiliser itself will now be described.

Considering the unit shown in Figure 1 it has been seen that any piece of controlled apparatus pivotally mounted about axes parallel with the axes A1 and A2 can be stabilized directly by imparting to the appropriate parts of the mountings, through power motors operated by the respective transmitters, movements equal and opposite to those imparted to the said transmitters. If, however, the pivotal axes of a particular piece of controlled apparatus are not parallel with the axes A1 and A2, then either (1) the impulses from the transmitters T1 and T2 must be suitably transformed by a corrector unit, or (2) the relative movements of the stabilizer unit must be expressed directly in terms of component rotations about a new set of axes parallel with the axes of the said piece of controlled apparatus.

One form of apparatus operating according to the second of these alternatives is illustrated in Figure 5. The unit shown in Figure 1 is incorporated in toto, and its parts are indicated as far as is necessary by the same reference symbols; the slip rings J, latitude riders LY, LR and torque motor TM4 have been omitted for greater clarity. The base B is pivotally mounted on a base B' about an axis A13 which, when both bases are horizontal, coincides with the vertical axis A3. A motor S13 adjusts the position of B with respect to B', and their relative displacement is measured by a transmitter T13. The gimbal frame F1 is pivotally connected at the top, about axis A3, with a gimbal frame F5; this is pivotally mounted about an axis A12 normal to A3 within an outer gimbal frame F6 which in turn is pivotally mounted about an axis A11 normal to A12 within brackets B3 mounted on the base B'. Relative movements between F5 and F6 are imparted through gearing WT12 to a transmitter T12, and relative movements between F6 and B' are imparted through gearing WT11 to a transmitter T11. The transmitters T11 and T12 thus provide stabilizing impulses with respect to the axes A11 and A12 in exactly the same way as the transmitters T1 and T2 do with respect to the axes A1 and A2. A transmitter TO3 measures the angular displacement between frames F1 and F5 about axis A3. The manner in which this apparatus is used will be understood from the example which will now be described with reference to Figure 6.

Figure 6 shows the application of the apparatus to a triaxial director 61 and a triaxial gun mounting 62 carried on separate training bases.

The director 61 comprises a sight 63 pivoted about an axis Y12 within a frame 64 mounted on a platform 65 which is itself rotatably mounted about an axis Y11 on a pedestal 66 carried by the training-base 67; this base is itself rotatable about the axis Y13 with respect to the fixed structure 68 of the moving body. The pedestal 66 also carries a stabilizing unit according to Figure 5, which is shown conventionally as a box 69 with the various associated transmitters and the motor S13 in juxtaposition therewith.

The gun 70 is supported by trunnions having an axis X2 in a cradle 71 which is itself pivotally mounted about the axis X1 on a pedestal 72 carried by the training base 73; this base is rotatable about the axis X13 (parallel with Y13) with respect to the fixed structure 68.

The base B' of the stabilizing unit 69 is secured to the pedestal 66 so that the axes A11 and A13 are parallel with the axes Y11 and Y13 respectively. The transmitter T11 is wired to a motor D11 which adjusts the position of the platform 65 with respect to the pedestal 66, the arrangement being such that any rotation of the transmitter rotor from a datum position causes the motor to operate in the appropriate direction. A second transmitter DR11 is connected in the circuit in such a way that its output combines differentially with that of T11, and the rotor of DR11 is connected mechanically to the motor D11; the transmitter DR11 thus acts as a resetter in the manner previously described, the motor D11 thus being caused to copy the movements imparted to the rotor of T11.

As a result of the stabilizing impulses from the transmitter T11 the motor D11 will thus operate to give the platform 65 movements relative to the pedestal 66 similar to those of the frame F6; the axis Y12 of the sight will thus be kept horizontal and parallel with the axis A12. For stabilization about the axis Y12, the transmitter T12 is connected in the manner previously described to the elevating motor D12 and resetter DR12, the arrangements so far described thus stabilizing the sight completely as regards roll and pitch. A transmitter 74 adds in the quantity generated elevation rate, which is derived from another part of the complete fire control system.

Finally, yaw stabilization is effected by the transmitters TO3 and T3 and motor D13, which rotates the whole training base 67 relatively to the deck. As axis A1 is (as hereinafter described) trained on gun bearing, lateral deflection has to be wiped out by means of TO3 in order to produce yaw stabilization for the director. It is important to note that since the motor D13 affects the stabilizer 69 as well as the sight, no separate resetter is required, rotation of the whole stabilizer automatically restoring the initial relative position of the rotor and stator of the transmitter T3. It may also be noted that a given relative angular displacement between the transmitter rotor and stator will in general require a somewhat different angular displacement of the training base 67 for exact restoration, since the former displacement takes place about the vertical axis A3 and the latter about the axis Y13 perpendicular to the deck plane; as in the similar case discussed in connection with Figure 2, however, the motor D13 will operate until the said restoration is actually effected, irrespective of the angular movement of the training base 67 required to achieve this. A further transmitter 75 adds in the quantity generated training rate.

The sight 63 is thus given its stabilizing impulses (apart from that for yaw stabilization) in terms of the axes A11 and A12, these axes always being parallel with its own axes Y11 and Y12 respectively. Owing to the different training of the gun the corresponding gun axes X1 and X2 cannot also be parallel with A11 and A12, but in accordance with the third aspect of the invention they are arranged to be parallel with A1 and A2 respectively, thus enabling the gun to be given its stabilizing impulses (apart from that for yaw) with respect to the latter axes. Constructional considerations demand that yaw stabilization for both sight and gun shall be affected by rotation of the heavy training bases 67 and 73 about the parallel axes Y13 and X13 which are normal to the deck plane.

The first requirement for gun stabilization must therefore be to adjust axis A1 so that it is parallel with the position that X1 should occupy to give the gun its correct training. Now the angle between the vertical planes through Y11 and X1 measured in a horizontal plane is known as the lateral deflection in azimuth, and this is calculated by another part of the fire control apparatus and fed to the transmitter 76. The impulse from TO3 controls the motor S13, the transmitter 76 acting as a resetter in the manner previously described. Here it is important to note that TO3, whose axis is vertical, always measures the angular displacement between A11 and A1 about the vertical axis A3, and although S13 is rotating B1 about the generally non-vertical axis A13, it will in any case always operate to make the output of TO3 equal and opposite to that of 76, so that A1 will be given the correct lateral deflection. The difference between the displacements, as regards lateral deflection, about the axes A3 and A13 may be called lateral deflection correction and the automatic inclusion of this correction, without the necessity for separate calculating apparatus, is an important feature of the invention.

The transmitter T13 thus gives lateral deflection as measured about the axis A13. To this must be added yaw stabilization and generated training, both measured about an axis parallel with A13. Both the latter quantities are combined in the output of a transmitter 77 operated from the motor D13, and the combined outputs of T13 and 77 are therefore made to operate, in conjunction with a resetter R13, the motor M13 which adjusts the training base 73 about the axis X13; this results in the correct positioning of the axis X1, which is now always parallel with A1. To make X2 parallel with A2 it is now necessary only to operate the motor M1, which adjusts the cradle 71 with respect to the pedestal 72 about axis X1, by means of the transmitter T1 in conjuction with a resetter R1.

Finally, the gun 70 must be adjusted with respect to the stabilized trunnion axis X2, the quantities which it requires being (1) stabilization with respect to axis A2, (2) generated elevation rate and (3) vertical deflection, i. e. the angle, measured in a vertical plane, between the line of sight of the director and the line of fire of the gun. Quantities (1) and (2) are supplied by transmitters T2 and 74 respectively and quantity (3) by a transmitter 78, the outputs of all three transmitters being combined to control the elevating motors M2 in conjunction with its resetter R2.

As an alternative to the construction shown in Figure 5 the unit may be designed in such a way that the base B is adapted to be rigidly secured to the director pedestal 66 and the base B' trained relatively thereto by the motor S13. In this case the sight axes Y11, Y12 in Figure 6 would be kept parallel to the axes A.1, A.2 respectively; further, the deflection wipe-out provided by TO3 in the control system of the motor D13 would no longer be necessary. The design shown in Figure 5, is, however, preferred owing to its greater constructional simplicity.

Figure 7 illustrates an alternative form of stabilizer whose construction differs from that shown in Figure 5 in the following respects. The brackets B3 between which the frame F6 is pivoted are mounted on the same base B as brackets B1, the axes A1 and A11 now coinciding. The frame F5, instead of being pivoted directly within F6 as in Figure 5, is pivoted about axis A12 within a frame F7 which is itself rotatably mounted within F6 on ball bearings 88; it is thus capable of rotation with respect to F6 about an axis A23 which, when the base B is in the horizontal position shown, coincides with A3. F7 is adjusted relatively to F6 by a motor S23 operating through gearing 95 which engages teeth 96 on F7, while similar gearing 97 operates a transmitter T23 which measures the relative position of F6 and F7. Apart from the above features and, of course, the absence of T13 and S13, the construction corresponds exactly in essentials with that of Figure 5.

Figure 8 illustrates a specific application of the stabilizer shown in Figure 7 to a combined triaxial director 61 and triaxial gun mounting 62; in this figure given reference symbols have the same meaning as in previous figures. The basic difference from the triaxial combination of Figure 5 is that the gun and sight pedestals 72 and 66 are now mounted on a common training base 89, with the axes X1 and Y11 parallel to each other and to the combined axes A1—A11 of a stabilizer 90 according to Figure 7 which is carried on the same base 89.

The gun cradle 71 is stabilized about axis X1 (parallel with A1—A11) by the system T1—R1—M1; this makes axis X2 parallel with A2, and enables the gun 70 to be provided with generated elevation rate, vertical deflection and stabilization about X2 by the transmitters 74, 78 and T2 respectively operating the motor M2 and resetter R2. Gun stabilization, apart from yaw, is thus effected in terms of the axes A1 and A2 as in Figure 6.

Considering now the corresponding axes Y11 and Y12 of the sight 63, we have seen that Y11, like X1, is made parallel to the common axis A1—A11. Y12 cannot in general, however, be parallel to A2, since the sight must be trained about axis Y23 relatively to the gun (as hereinafter described) to allow for lateral deflection. Y12 is therefore made parallel to A12 which is itself made to differ in angular position from A2, in the horizontal plane, by the amount of the lateral deflection; this is effected by the circuit 76—TO3—S23 in a manner which will be clear from a consideration of the analogous circuit TO3—76—S13 in Figure 6. (Note: two transmitters 76, coupled mechanically, are shown in Figure 8.) The manner in which Y12 is made parallel to A12 will be considered in the following paragraphs, but assuming that this is so it will readily be seen how the sight is now stabilized about Y11 by the system T11—DR11—D11 and stabilized and adjusted about Y12 by the system 74—T12—DR12—D12, generated elevation rate being added in by 74 as before. The axis Y23 is now parallel with A23.

As regards the training system, it is important that the training of the sight should be accurate and independent of that of the gun. Since the sight is already carried on the training base 89, which is set in accordance with gun-training by the motor M13, it is necessary to wipe this out from the sight-training drive 94; this is done by connecting the drive 94 to the sight-training motor D23 through a differential 91, the third member of which is connected to the motor M13 to provide a wipe-out drive. The sight-training system is thus rendered mechanically independent of any imperfections in the gun-training system.

The motor D23 and its resetter DR23 are connected to the transmitter T3, a wipe-out transmitter 92 connected to the motor M13, a transmitter 75 giving generated training rate, and the transmitters T23 and 76. The necessity for the wipe-out transmitter 92 arises from the fact that the output of the transmitter T3 includes gun-training as well as the stabilizing impulses (owing to the fact that the stabilizer is carried on the base 89), and it is therefore again necessary to eliminate this from the sight-training drive; the transmitters T3 and 92 thus neutralize each other electrically as regards gun-training in the same way as the drive from the motor M13 through the differential 91 provides mechanical compensation for the fact that the sight is carried on the base 89.

Finally, it is necessary to train the gun in accordance with the setting of the stabilized sight plus lateral deflection. The motor M13 and its resetter R13 are therefore connected to a transmitter 93 driven by the motor D23 and to the transmitter T23, the latter transmitter inserting lateral deflection as measured about axis A23, the axis about which the sight is in effect trained relatively to the gun. The setting of the transmitter 93 incorporates the lateral deflection correction required by the sight (T23—76) which is, however, not required by the gun and is therefore wiped out by incorporating the output of the transmitter T23 also in the control circuit of M13.

The gun control systems described above have been of the "high angle" type adapted for use against targets having an elevation from the horizon. For "low angle" work in which the target is always on the horizon, such as arises in the case of a ship firing on another ship or a shore target, a simplified application of the unit shown in Figure 1 to biaxial systems becomes possible, and such an application will now be described.

Figure 9 shows a unit 1 according to Figure 1 mounted on the same training base 67 as a biaxial sight 63, the axis Y1 of the sight now being made parallel with axis A1 of the stabilizing unit. It is now required that the line of sight of 63 shall always be horizontal, and it is therefore kept parallel with A2 by controlling the sight elevating motor D1 with its resetter DR1 by the transmitter T1, an additional transmitter 104 being included in the circuit for the purpose of adjustment and also for effecting hand stabilization of the sight in the event of the stabilizer breaking down. Stabilization and control of the line of sight in azimuth is effected by controlling the training motor D13 by the transmitter T3 and a transmitter 75 adding in generated training rate as in earlier applications. The sight 63 may obviously be replaced by a searchlight, rangefinder, radar aerial system or any other piece of apparatus having a principal axis which requires to be stabilized and trained always in a horizontal plane.

It is to be understood that although the various transmitters and torque motors employed in the gyroscopic stabilizing units herein described are generally shown as being operated or operating through gearing, it may be preferable in some cases to connect their rotors directly to the members with which they are to cooperate, this arrangement being advantageous as regards the minimization of friction if other design considerations permit its adoption.

I claim:

1. In a gyroscopic stabilizing apparatus, a non-pendulous system comprising a first gyroscope providing a horizontal plane datum, a gimbal frame member supporting said first gyroscope directly by the spin axis member of said first gyroscope, a second gyroscope gimbal mounted directly on said frame member to provide a vertical plane datum, said second gyroscope with its gimbal mounting forming a subsidiary non-pendulous system rotatable about the line of the spin axis of said first gyroscope, torque motors connected to bring about precession of said gyroscopes and vertical sensitive elements controlling the operation of said torque motors to maintain the spin axis of said first gyroscope substantially vertical and to maintain the spin axis of said second gyroscope substantially horizontal.

2. In a gyroscopic stabilizing apparatus as set forth in claim 1, a mounting for said gyroscopes movable relatively to said gyroscopes about three mutually perpendicular axes, a support for said mounting, means connecting said support and said mounting for relative pivotal movement about at least one additional axis, and electrical transmission means carried by said support and having outputs representing a resolution into terms of component rotations of the relative position between the axes of said mounting and the parts carried thereby, and the set of axes of said support.

3. In a gyroscopic stabilizing apparatus, a system as set forth in claim 1, a mounting for said gyroscopes movable relative to said gyroscopes about three mutually perpendicular axes, first electrical transmission means having outputs representing the instantaneous angular displacements between said mounting and said horizontal and vertical data; a further gimbal system freely mounting said unit; and second electrical transmission means for resolving the outputs of said first transmission means into corresponding outputs with respect to a pair of axes, one of which is kept parallel with one of the system of axes with respect to which the outputs of said first transmission means are given while the other of the said pair of axes is angularly adjustable relative to the first of the said pair, said gimbal system including a pair of rings relatively rotatable and lying in a single plane, one of said rings carrying the other, and a base member having aligned pivotal mountings for one of said rings and for said unit.

4. In a gyroscopic stabilizing apparatus, a system as set forth in claim 1, and a mounting for said gyroscopes movable relatively to said gyroscopes only about three mutually perpendicular axes.

5. In a gyroscopic stabilizing apparatus, a system as set forth in claim 1, a mounting for said gyroscopes movable relatively to said gyroscopes about three mutually perpendicular axes, a support for said mounting, and means connecting said support and said mounting for relative pivotal movement about at least one additional axis.

6. In a gyroscopic stabilizing apparatus, a system as set forth in claim 1, a mounting for said gyroscopes movable relatively to said gyroscopes about three mutually perpendicular axes, and a support for said mounting comprising a gimbal system providing freedom of movement for said mounting about three axes, all of which are movable angularly with respect to the axes of said mounting.

7. In a gyroscopic stabilizing apparatus, a system as set forth in claim 1, a mounting for said gyroscopes movable relative to said gyroscopes about three mutually perpendicular axes, first electrical transmission means having outputs representing the instantaneous angular displacements between said mounting and said horizontal and vertical data; a further gimbal system freely mounting said unit; and second electrical transmission means for resolving the outputs of said first transmission means into corresponding outputs wth respect to a pair of mutually perpendicular axes angularly movable relative to the system of axes with respect to which the outputs of said first transmission means are given.

8. In a gyroscopic stabilizing apparatus, a system as set forth in claim 1, a mounting for said gyroscopes movable relative to said gyroscopes about three mutually perpendicular axes, first electrical transmission means having outputs representing the instantaneous angular displacements between said mounting and said horizontal and vertical data; a further gimbal system freely mounting said unit; and second electrical transmission means for resolving the outputs of said first transmission means into corresponding outputs with respect to a pair of axes, one of which is kept parallel with one of the system of axes with respect to which the outputs of said first transmission means are given while the other of the said pair of axes is angularly adjustable relative to the first of the said pair.

9. In a gyroscopic stabilising apparatus, a nonpendulous system comprising a first gimbal frame pivoted on a normally horizontal axis, a second gimbal frame pivoted in said first gimbal frame on a normally horizontal axis perpendicular to the pivotal axis of said first gimbal frame, a first gyroscope rotor journalled on a normally vertical spin axis in said second gimbal frame, a third gimbal frame pivoted in said second gimbal frame coaxially with the spin axis of said first gyroscope rotor, a fourth gimbal frame pivoted in said third gimbal frame on a normally horizontal axis, a second gyroscope rotor journalled in said fourth gimbal frame on a normally horizontal spin axis perpendicular to the pivotal axis of said fourth gimbal frame, vertical sensitive elements on said first, second and fourth gimbal frames and torque motors under control of said vertical sensitive elements connected to act on said first, second and third gimbal frames to bring about precession of said gyroscope rotors to maintain the spin axis of said first gyroscope rotor substantially vertical and the spin axis of said second gyroscope rotor substantially horizontal.

10. In a gyroscopic apparatus, an arrangement as set forth in claim 9, a rotatable base member pivotally supporting said system by said first gimbal frame, a fixed base member on which said rotatable base member is rotatable about an axis which when vertical is aligned with the spin axis of said first gyroscope rotor, a fifth gimbal frame surrounding said system and pivoted on a normally horizontal axis to said fixed base member and a sixth gimbal frame pivoted to said fifth gimbal frame on a normally horizontal axis perpendicular to the pivotal axis of said fifth gimbal frame, said sixth gimbal frame spanning said system and pivotally connected to the top of said second gimbal frame on the spin axis of said first gyroscope rotor.

AREND WILLEM KUYVENHOVEN.

REFERENCES CITED

The following references are of record in the file of this patent:

UNITED STATES PATENTS

| Number | Name | Date |
|---|---|---|
| 1,442,799 | Gray | Jan. 23, 1923 |
| 1,639,233 | Paxton | Aug. 16, 1927 |
| 1,733,531 | Dugan | Oct. 29, 1929 |
| 1,840,104 | Anschutz-Kaempfe | Jan. 5, 1932 |
| 1,942,737 | Wood | Jan. 9, 1934 |
| 1,950,517 | Rawlings | Mar. 13, 1934 |
| 1,988,521 | Sperry et al. | Jan. 22, 1935 |
| 2,005,530 | Boykow | June 18, 1935 |
| 2,008,058 | Boykow | July 16, 1935 |
| 2,077,849 | Moller et al. | Apr. 20, 1937 |
| 2,302,894 | Ross | Nov. 24, 1942 |
| 2,339,508 | Newell | Jan. 18, 1944 |
| 2,414,108 | Knowles et al. | Jan. 14, 1947 |